0
United States Patent Office 3,223,679
Patented Dec. 14, 1965

3,223,679
DERIVATIVES OF ALKENYL AROMATIC POLYMERS HAVING PENDANT VINYL KETO GROUPS THEREIN
Frederick C. Leavitt, Framingham, Mass., assignor to The Dow Chemical Company, Midland, Mich., a corporation of Delaware
No Drawing. Filed July 16, 1962, Ser. No. 210,216
28 Claims. (Cl. 260—66)

This invention relates to derivatives formed by the reaction of conjugated diens with alkenyl aromatic polymers having pendant vinyl keto groups therein. More specifically, it relates to the process of effecting such additions and the products obtained thereby, in which additions the vinyl group of the vinyl keto group adds 1,4 to the conjugated unsaturation.

Applicant's copending applications Serial Nos. 198,709 and 221,343, now abandoned, disclose compositions and methods for the preparation of polymers suitable for the practice of this invention from preformed alkenyl aromatic polymers to which a plurality of pendant vinyl keto groups are attached to the aromatic nuclei of the polymers.

In accordance with the present invention it has now been found that the vinyl group of said vinyl keto pendant radical is much more reactive than an ordinary vinyl group such as is present in a linear polymer of divinylbenzene, etc. As a result, it has been found possible to effect addition of various conjugated diene compounds by the 1,4-addition of said diene to the vinyl group of the vinyl keto radical. As a consequence, a number of modifications can be made to such polymers by the addition described herein, particularly the addition of highly chlorinated dienes with resultant fire retardant properties.

In the aforementioned copending applications, applicant has described the preparation of vinyl keto polymers from preformed polymers of an alkenyl aromatic monomer of the formula of $CH_2=C(R)Ar$, wherein R represents hydrogen or a lower alkayl radical, preferably methyl, or ethyl, and Ar represents a phenyl, naphthyl or diphenyl radical or various derivatives thereof as described hereinafter. The resultant vinyl keto polymers have at least 0.01 molar equivalents of vinyl keto groups, such as $—C(O)—CH=CH_2$ groups, on the basis of each 100 aromatic nuclei in said polymer. Preferably such polymers contain 5–30 molar equivalents on the same basis, and can even go as high as 50 molar equivalent.

The preformed alkenyl aromatic polymers have repeating units therein of the formula

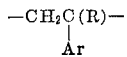

and the vinyl keto polymer has a plurality of the same type of repeating unit therein and also a plurality of repeating units having pendant unsaturated keto groups as defined in the aforementioned copending applications.

In effecting the addition of the diene compound to the vinyl group of the vinyl keto polymer, various diene compounds can be used as described hereinafter. Where it is desired to impart fire-retardant properties to the polymer product, the dienes advantageously have a high proportion of chlorine or bromine therein.

These diene compounds are advantageously butadiene, cyclopentadiene, cyclohexadiene-1,3 and various derivatives thereof in which the substituent groups are selected from the group consisting of alkyl, aryl, cycloalkyl, alkoxy, aryloxy, cycloalkoxy, cyano and halogen groups. In these aforementioned groups which contain hydrocarbon portions, the hydrocarbon portion is preferably of no more than 8 carbon atoms, and it is preferred that the total number of carbon atoms in the diene itself is no more than 16 carbon atoms.

Typical specific diene compounds that can be used in the practice of this invention include, but are not restricted to the following: butadiene-1,3, cyclopentadiene, cyclohexadiene-1,3, hexachlorocyclopentadiene, pentachlorocyclopentadiene, tetrachlorocyclopentadiene, dichlorocyclopentadiene, hexachlorocyclohexadiene-1,3, tetrachlorocyclohexadiene-1,3, dichlorocyclohexadiene-1, 3,2-chlorobutadiene-1,3, 2,3-dichloro-butadiene-1,3, 1,2, 3,4-tetrachloro-butadiene-1,3, 2 - phenyl - butadiene - 1,3, 2,3-diphenyl-butadiene-1,3, 2-(diphenyl)-butadiene-1,3, 2-tolyl-butadiene-1,3, 2-dicyclohexyl-butadiene-1,3, 2-cyclohexyl-pentadiene-1,3, 2-cyclopentyl-butadiene-1,3, phenyl-cyclopentadiene, phenyl-cyclohexadiene-1,3, methyl-cyclohexadiene-1,3, ethyl-cyclohexadiene-1,3, methyl cyclohexadiene-1,3, isoprene, 2-ethyl-butadiene-1,3, pentadiene-1,3, hexadiene-1,3, hexadiene-2,4, hexabromocyclopentadiene, hexafluoro-cyclopentadiene, tetraiodocyclopentadiene, tetrafluoro-cyclopentadiene, tetrabromocyclopentadiene, 2 - cyano-butadiene-1,3, cyano-cyclopentadiene, cyano-cyclohexadiene-1,3, 1,2,3,4-tetrachloro- butadiene-1,3, 1,2,3,4-tetrafluoro-butadiene-1,3, etc.

While the vinyl keto group of the formula

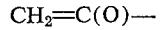

is preferred in the practice of this invention it is also suitable to use in the practice of this invention polymers having "vinyl keto groups" as defined in the aforementioned copending application Serial No. 198,709 by either of the formulas: $R'CH=C(R')—C(O)—$ or

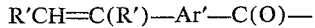

wherein one R' represents hydrogen and the other represents hydrogen or a methyl, phenyl, cyano or chloro radical, and Ar' is a divalent radical selected from the class consisting of phenylene, diphenylene and naphthalene radicals and various derivatives thereof in which each derivative group is selected from the class defined above as suitable for the preformed polymer from which the vinyl keto derivatives are prepared.

Polystyrene is preferred as the preformed starting polymer from which the vinyl keto derivatives are prepared for use in the practice of this invention, but other polymers of alkenyl aromatic compounds can be used, preferably those in which the aromatic ring has no substitution or a small amount of substitution, in addition to the alkenyl group. Other substituents on the aromatic ring can include, but are not limited to, various aliphatic, cycloaliphatic and aromatic hydrocarbon groups, preferably of no more than about 8 carbon atoms, halogen, e.g. Cl, F, Br and I, etc.

Typical alkenyl aromatic compounds that can be used as the preformed starting polymer include but are not restricted to polymers of the following: styrene, alphamethylstyrene, alphaethylstyrene, various derivatives of styrene having the substituent groups attached to the aromatic nucleus, such as, methyl styrene, ethyl styrene, cyclohexyl styrene, cyclopentyl styrene, propyl styrene, butyl styrene, heptyl styrene, octyl styrene, and the corresponding derivatives of α-methylstyrene, α-ethyl styrene, etc., chloro styrene, cyanomethyl styrene, etc., preferably with the nuclear substituent groups of the preceding compounds in a position other than para to the alkenyl group, vinyl naphthalene, isopropenyl naphthalene, vinyl methyl naphthalene, vinyl ethyl naphthalene, vinyl dimethyl naphthalene, vinyl hexyl naphthalene, vinyl diethyl naphthalene, isopropenyl diphenyl, vinyl methyl diphenyl, vinyl butyl diphenyl, vinyl chloro naphthalene, vinyl cyano naphthalene, vinyl cyanoethyl naphthalene, isopropenyl bromo naphthalene, vinyl chloro diphenyl, isopropenyl cyano diphenyl, isopropenyl fluoro diphenyl, etc.

As indicated above, various copolymers of alkenyl aromatic compounds are also included for use as the preformed starting polymer for preparing the vinyl keto derivatives used in the practice of this invention. In such cases it is desirable to have at least 5% of the alkenyl aromatic monomer contained in the copolymer so as to provide sufficient aromatic nuclei which can be acylated to provide a desired amount of crosslinking groups, preferably at least 20%, particularly where the comonomer may have substituents therein which retard or interfere with the acylation. In some cases it may be desirable to use copolymers of one alkenyl aromatic group having no substituents or no more than one substituent on the aromatic nucleus, and as the comonomer an alkenyl aromatic monomer having a high degree of substitution thereon, in which case the latter monomer does not have positions easily available for acylation. In such case it is desirable to use copolymers of monomer mixtures having at least 5% of the unsubstituted or substituted alkenyl aromatic compound having one substituent group other than the alkenyl group.

Generally, however, it is preferred to use at least 20% of an alkenyl aromatic compound having a number of positions available for acylation even though it is not intended, or possibly desired, to substitute an acyl group on each of such nuclei.

In addition to various alkenyl aromatic compounds having a high degree of substitution thereon of the groups indicated above, it is also desirable in many cases to use other modifying comonomers in conjunction with the unsubstituted or monosubstituted alkenyl aromatic compounds. Preferred comonomers are those which are not reactive with or reacted on by the $AlCl_3$. Typical preferred comonomers, in addition to the various alkenyl aryl compounds listed above, are ethylene, propylene, butenes, butadiene, isoprene, vinyl ethyl ether, acrylonitrile, methyl methacrylate, etc.

Advantageously, the polymers used as starting materials for preparing the vinyl keto derivatives for use in the practice of this invention are solid at room temperature. Molecular weights of no less than 3000 are generally preferred, although in some cases where a high degree of acylation is to be effected with the result that the molecular weight will be multiplied considerably upon crosslinking, even a lower molecular weight can often be used. There is no upper limit on the molecular weight of the polymers that can be used. With higher molecular weights such as 150,000 or higher, the number of acyl groups to be introduced to produce insolubility and infusibility upon crosslinking, is obviously much smaller than is the case where lower molecular weight polymers are used.

While it is generally preferred to have a linear, soluble polymer as the preformed starting polymer, it is also desirable in some cases to prepare the vinyl keto derivatives of crosslinked, insoluble polymers where it is desired to effect the substitution of vinyl keto groups on a limited portion of the starting polymer. For example, the vinyl keto radical addition can be effected on the surface of beads, pellets, and particles of such crosslinked, insoluble polymers. In such cases, it is generally helpful to have a swelling of the polymer by absorption of a solvent. Typical crosslinked insoluble polymers which can be used for this purpose are those polymers of alkenyl aromatic compounds as listed above, which have been copolymerized with minor amounts of difunctional monomers such as divinyl benzene, divinyl toluene, divinyl naphthalene, divinyl diphenyl, diisopropenyl benzene, ethylene glycol diacrylate, divinyl phthalate, etc.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight. Unless indicated otherwise, the terms "polymer" and "polymeric" as used herein throughout this specification, include both homopolymers and heteropolymers. The expression "degree of substitution" (sometimes abbreviated as D.S.), as used herein, means the number of vinyl keto groups substituted per 100 aromatic nuclei in the preformed polymer.

*Example I*

In a reactor equipped with a stirrer, a solution of 25 parts of a polystyrene resin in 250 parts of methylene chloride is added. The polystyrene resin has a low molecular weight as evidenced by an absolute viscosity of 2 centipoises determined on a 10% by weight solution in toluene at 25° C. To this resin-methylene chloride solution is added slowly 2.8 parts of acrylyl chloride. Then at room temperature and with simultaneous vigorous stirring, there is added 4.5 parts of anhydrous $AlCl_3$ powder. Stirring is continued for about twenty minutes after the $AlCl_3$ addition is completed. The solution is then poured onto a dilute HCl-ice mixture having a combined volume of approximately three times that of the reaction mixture and having sufficient ice therein to occupy approximately the same volume as the dilute acid. After separation of the precipitated polymer product, infra-red analysis shows that there are 7.5 vinyl keto groups substituted per 100 aromatic nuclei on a molar basis.

When the foregoing procedure is repeated using varying amounts of acrylyl chloride, the degree of substitution can be modified accordingly. Such polymers can be used in the practice of this invention as described in subsequent examples.

*Example II*

In this example a polystyrene of high molecular weight is used as evidenced by an absolute viscosity of 25 as determined on a 10% by weight solution in toluene at 25° C.

The procedure of Example I is repeated using 4 parts of polystyrene in 200 parts of chlorobenzene, 0.49 part of acrylyl chloride, and 1 part of anhydrous $AlCl_3$ powder. The resultant mixture is stirred vigorously at 35° C. for 1.5 hours. After precipitation and separation of the resultant polymer, infra-red analysis shows a vinyl keto substitution of approximately 8% on an aromatic nuclei molar basis. Likewise, as in Example I, the degree of substitution can be modified by varying the amount of acrylyl chloride used, and polymers prepared as above can be used in the practice of this invention. Other preformed alkenyl aromatic polymers, as disclosed above, can be substituted for the polystyrene in this example and in Example I to produce vinyl keto derivatives suitable for the practice of this invention.

*Example III*

One part each of three vinyl keto polystyrenes prepared according to the procedure of Example II and having a degree of substitution of 3.9, 7.5 and 15.6, respectively, are individually dissolved in 20 parts of xylene. Then one part of hexachlorocyclopentadiene is added to each of these solutions and the respective flasks containing the solutions are stoppered and heated to 110° C. for 48 hours. The products are then precipitated with methyl alcohol and then reprecipitated twice from methylene chloride solution. Upon analysis, the polymer products show chlorine contents of 6.8, 12.4 and 20.6% respectively. These polymers show good fire-retardant properties, particularly those with the higher chlorine content.

*Example IV*

The procedure of Example III is repeated using vinyl keto polystyrenes prepared according to the procedure of Example I, the degree of substitution being 3, 6.5 and 7.5, respectively. Similar increasing contents of chlorine are obtained in the resultant polymers.

*Example V*

The procedure of Example III is repeated using in place of the hexachlorocyclopentadiene an equivalent amount respectively of the following conjugated dienes: butadiene, cyclopentadiene, isoprene, cyclohexadiene-1,3, tetrachlorocyclopentadiene, tetrachlorocyclohexadiene-1,3; 2,3-dichlorobutadiene-1,3, 2-cyanobutadiene-1,3, and 2-phenylbutadiene-1,3. In each case the conjugated diene addition is effected as in Example III.

*Example VI*

The procedure of Example III is repeated using in place of the vinyl keto polystyrene, an equivalent amount of vinyl keto derivatives having approximately the same degree of substitution in which the preformed polymer is a polymer of: vinyl toluene, α-methyl styrene, vinyl naphthalene, chlorostyrene, bromostyrene, vinyl diphenyl and vinyl anisole. In each case similar results are obtained.

*Example VII*

The procedure of Example III is repeated a number of times using in place of the vinyl keto polystyrene a polystyrene derivative having a different unsaturated keto group prepared according to the procedure of Example II in which the acrylyl chloride is replaced by an equivalent amount of methacrylyl chloride, α-chloro-acrylyl chloride, α-bromo acrylyl chloride, crotyl chloride, α-phenyl-acrylyl chloride, α-cyano-acrylyl chloride, and p-vinyl-benzoyl chloride respectively. The various polymer derivatives used in this example have the following vinyl keto groups attached to the aromatic nuclei; methacrylyl, α-chloro-acrylyl, α-bromo-acrylyl, crotyl, α-phenyl-acrylyl, α-cyano-acrylyl respectively and p-vinyl-benzoyl groups. Similar results are obtained as in Example III upon reaction with the conjugated diene.

*Example VIII*

The procedure of Example III is repeated with similar results using an equivalent amount of a polystyrene derivative having a D.S. of 8 of p-vinyl-benzoyl radicals attached to the aromatic nuclei as the vinyl keto reagent and using an equivalent amount of butadiene-1,3 as the conjugated diene.

In addition to the fire-retardant properties described above, which are effected with compounds having halogen atoms therein, the products of this invention can be used for attaching various derivative groups to the unsaturation in the ring resulting from the addition of the conjugated diene group to the ethylenic group of the vinyl keto group. For example, halogen can be added by post reaction in those compositions prepared from the hydrocarbon type of conjugated dienes. Other additives capable of adding to ethylenic unsaturation can also be attached, such as metal hydrides, etc. The polymer products of this invention can be processed for ultimate use in the same general manner used for polystyrene, such as in various forms of molding, film formation, expanded products, etc., except that fire-retardance or other improved property is effected in the ultimate product.

The products of this invention have, in addition to the repeating unit structure of the preformed styrene product from which the vinyl keto derivative is formed, repeating units of an alkenyl aromatic unit in which the attached vinyl keto group has been converted to the cyclic structure described herein together with those vinyl keto groups which have not been so converted. For example, the products produced according to the preceding examples have the following repeating unit structures, respectively.

Examples I and II:

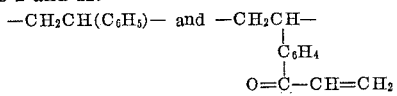

Examples III and IV, in addition to those shown above for Examples I and II:

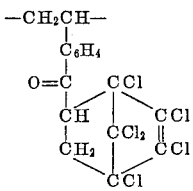

Example V, in addition to those shown above for Examples I and II:

From butadiene—

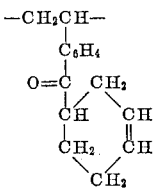

From cyclopentadiene—

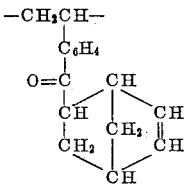

From isoprene—

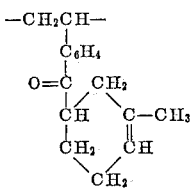

From cyclohexadiene-1,3—

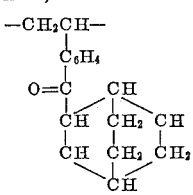

From 2,3-dichlorobutadiene-1,3—

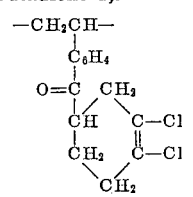

From 2-cyanobutadiene-1,3—

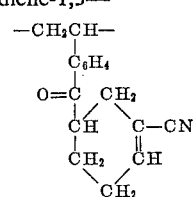

From 2-phenyl-butadiene-1,3—

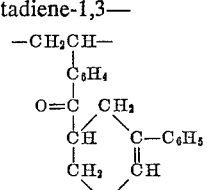

Example VII, in addition to those shown above for Examples I and II:

From p-vinyl-benzoyl-chloride—

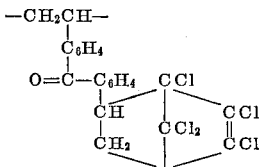

In Example VIII, the repeating units have the structures:

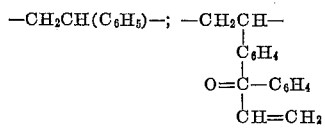

and

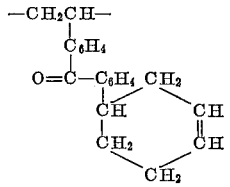

The polymer products of this invention are defined broadly as having a plurality of repeating units in the polymer structure of the general formulas:

From the preformed alkenyl aromatic polymer:

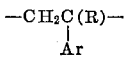

wherein R and Ar are as defined above.

From the intermediate vinyl keto derivative:

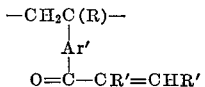

or

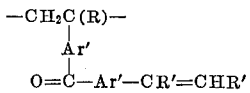

wherein R, Ar' and R' are also as defined above.

From the reaction of the vinyl keto groups with the conjugated dienes, which are represented by the formulas:

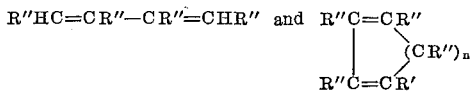

wherein $n$ has a value of 1 or 2, R'' is hydrogen, halogen, cyano, alkoxy, aryloxy, cycloalkoxy, alkyl, aryl or cycloalkyl, with the total number of carbon atoms in the hydrocarbon portions of said R'' groups in any one compound totaling no more than 7 carbon atoms, the unsaturated cyclic derivative groups have a repeating unit structure:

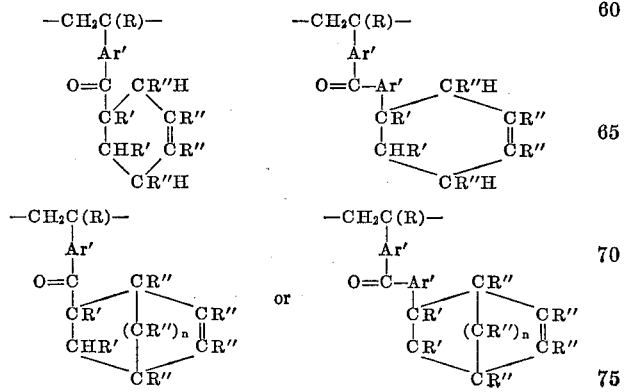

The content of the derivative groups produced according to this invention is governed by the content of the vinyl keto groups in the starting polymer. Obviously, the number of cyclic derivative groups produced by this invention cannot be greater than the number of vinyl keto groups in the starting polymer. Generally, it is possible to convert substantially all of the vinyl keto groups to the cyclic structure by using an excess of the conjugated diene and continuing the reaction for a period sufficient to permit such additions to be completed. Without extended reaction period, it is possible without difficulty to convert 90% or more of the vinyl keto groups to the cyclic structure. Consequently, it is possible to produce polymers in the course of the practice of this invention in which the repeating unit having the unsaturated aliphatic cyclic structure is present in amounts of 0.01–50, preferably 5–30 units per 100 aromatic nuclei in the alkenyl aromatic polymer.

While the examples show the use of a temperature of 110° C. for 48 hours, this extended period is used to insure complete reaction. Actually substantially complete reaction is obtained at this temperature in less than 24 hours. Even at room temperature the reaction proceeds reasonably well with at least 1% of the reaction being completed within 10 minutes with the degree of reaction increasing with longer periods of reaction. At room temperature complete reaction can be assured by a reaction period of about 72 hours. Temperatures of room temperature to 150° C. are appropriate, and where the diene is volatile the reaction is advantageously conducted at superatmospheric pressures sufficient to contain the reagent at the desired reaction temperature.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of preparing a cyclic derivative of a preformed aromatic polymer having pendant vinyl keto groups extending therefrom comprising the step of reacting
    (a) said preformed polymer of an alkenyl aromatic compound of the formula $CH_2=C(R)$—Ar, wherein R is a radical selected from the class consisting of hydrogen, methyl and ethyl radicals, Ar is an aromatic group selected from the class consisting of phenyl and naphthyl groups and the derivatives thereof in which each derivative group is selected from the class consisting of chloro, bromo, fluoro, cyano, alkyl, cycloalkyl and aryl groups, said alkyl, cycloalkyl and aryl derivative groups each having no more than 8 carbon atoms, said preformed polymer having pendant vinyl keto groups extending from a plurality of the aromatic nuclei therein, said vinyl keto groups having a formula selected from the class consisting of $R'CH=CR'$—$C=O$ and $R'CH=CR'$—$Ar'$—$C=O$, wherein in each formula, one R' represents hydrogen, and the other R' represents a radical selected from the class consisting of hydrogen, methyl, phenyl, cyano and chloro radicals, and Ar' is a divalent aromatic radical selected from the class consisting of phenylene, naphthylene and diphenylene radicals and derivatives thereof in which each derivative group is selected from the class consisting of chloro, bromo, fluoro, alkyl, cycloalkyl and aryl groups, said alkyl, cycloalkyl and aryl derivative groups each having no more than 8 carbon atoms therein, said vinyl keto groups being present in a proportion of at least 0.01 unit and no more than 50 units per 100 aromatic nuclei in said polymer with
(b) a conjugated diene compound having a formula selected from the class consisting of

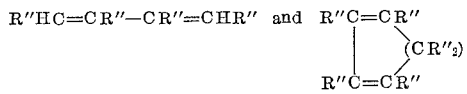 and 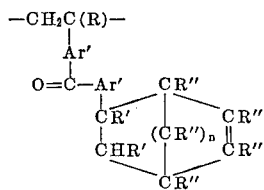

wherein $n$ is an integer having a value of no less than 1 and no greater than 2, and R″ is a radical selected from the class consisting of hydrogen, halogen, cyano, alkoxy, aryloxy, cycloalkoxy, alkyl, aryl and cycloalkyl radicals with the total number of carbon atoms in said R″ radicals totaling no more than 7.

2. The process of claim 1, in which said vinyl keto groups are present in a proportion of 5–30 units per 100 aromatic nuclei in said preformed polymer.

3. The process of claim 1, in which said reaction is conducted at a temperature of room temperature to 150° C. for a period of at least 10 minutes.

4. The process of claim 1, in which said preformed polymer is a polymer of styrene and said vinyl keto groups have the formula R′—CH=CR′—C=O.

5. The process of claim 4, in which said vinyl keto groups have the formula $CH_2$=CH—C=O.

6. The process of claim 5, in which said conjugated diene is hexachlorocyclopentadiene.

7. The process of claim 5, in which said conjugated diene is butadiene-1,3.

8. The process of claim 5, in which said conjugated diene is isoprene.

9. The process of claim 5, in which said conjugated diene is 2,3-dichlorobutadiene-1,3.

10. The process of claim 1, in which said conjugated diene is hexachlorocyclopentadiene.

11. The process of claim 1, in which said conjugated diene is butadiene-1,3.

12. The process of claim 1, in which said conjugated diene is isoprene.

13. The process of claim 1, in which said conjugated diene is 2,3-dichlorobutadiene-1,3.

14. The process of claim 1, in which said preformed polymer is a polymer of styrene and the vinyl keto groups extending therefrom have the formula R′CH=CR′—Ar′—C=O 15. The process of claim 14, in which said vinyl keto groups have the formula $CH_2$=CH—$C_6H_4$—C=O.

16. The process of claim 15, in which said diene is hexachlorocyclopentadiene.

17. A linear polymer having in the polymer chain thereof a plurality of aromatic repeating units having the formula

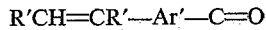

and also a plurality of cyclic repeating units having a formula selected from the class consisting of

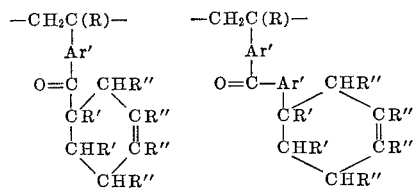

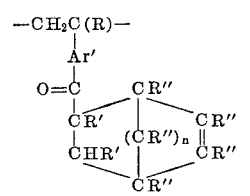

and

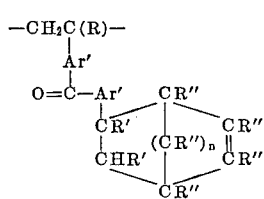

wherein R is a radical selected from the class consisting of hydrogen, methyl and ethyl radicals, Ar is an aromatic group selected from the class consisting of phenyl and naphthyl groups and the derivatives thereof in which each derivative group is selected from the class consisting of chloro, bromo, fluoro, cyano, alkyl, cycloalkyl and aryl groups, said alkyl, cycloalkyl and aryl derivative groups each having no more than 8 carbon atoms, one R′ in each formula represents hydrogen, and the other R′ represents a radical selected from the class consisting of hydrogen, methyl, phenyl, cyano, and chloro radicals, Ar′ is a divalent aromatic radical selected from the class consisting of phenylene, naphthylene and diphenylene radicals and derivatives thereof in which each derivative group is selected from the class consisting of chloro, bromo, fluoro, alkyl, cycloalkyl and aryl groups, said alkyl, cycloalkyl and aryl derivative groups each having no more than 8 carbon atoms therein, $n$ is an integer having a value of no less than 1 and no greater than 2, and R″ is a radical selected from the class consisting of hydrogen, halogen, cyano, alkoxy, aryloxy, cycloalkoxy, alkyl, aryl and cycloalkyl radicals with the total number of carbon atoms in said R″ radicals totaling no more than 7.

18. A polymeric composition of claim 17, in which said cyclic groups are present in a molar equivalent proportion of at least 0.01 and no more than 50, on the basis of each 100 aromatic nuclei in said polymer.

19. A polymeric composition of claim 17, in which said cyclic groups are present in a molar equivalent proportion of at least 5 and no more than 30, on the basis of each 100 aromatic nuclei in said polymer.

20. A polymeric composition of claim 17, in which said cyclic repeating units have the formula

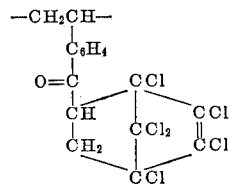

21. A polymeric composition of claim 17, in which said cyclic repeating units have the formula

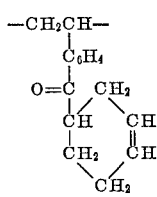

22. A polymeric composition of claim 17, in which said cyclic repeating units have the formula

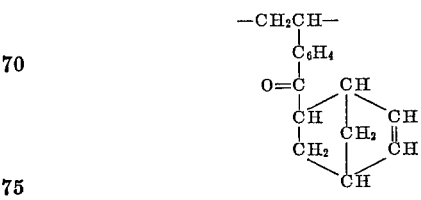

23. A polymeric composition of claim 17, in which said cyclic repeating units have the formula

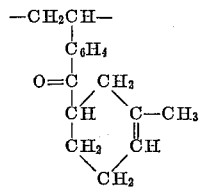

24. A polymeric composition of claim 17, in which said cyclic repeating units have the formula of

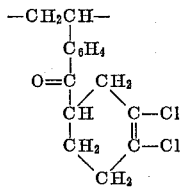

25. A polymeric composition of claim 17, in which said aromatic repeating units have the formula

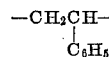

and said cyclic repeating units have the formula

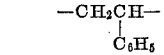

26. A polymeric composition of claim 17, in which said aromatic repeating units have the formula

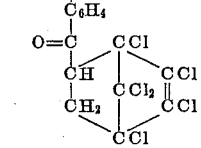

and said cyclic repeating units have the formula

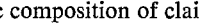

27. A polymeric composition of claim 17, in which said aromatic repeating units have the formula

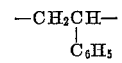

and said cyclic repeating units have the formula

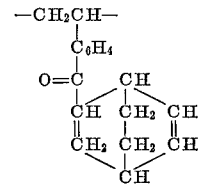

28. A polymeric composition of claim 17, in which said aromatic repeating units have the formula

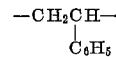

and said cyclic repeating units have the formula

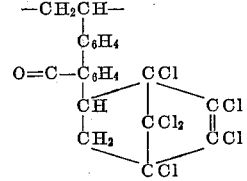

References Cited by the Examiner

UNITED STATES PATENTS

| | | | |
|---|---|---|---|
| 2,399,817 | 5/1946 | Meyer | 260—63 |
| 2,415,796 | 2/1947 | Lickty | 260—63 |
| 2,521,359 | 9/1950 | Garber | 260—85.3 |
| 2,566,302 | 9/1951 | Allen et al. | 260—66 |
| 2,708,665 | 5/1955 | Unruh | 260—93.5 |
| 2,713,570 | 7/1955 | Kenyon et al. | 260—63 |
| 2,716,097 | 8/1955 | Unruh et al. | 260—93.5 |
| 2,716,102 | 8/1955 | Unruh et al. | 260—93.5 |
| 2,991,269 | 7/1961 | Nozaki | 268—875 |

FOREIGN PATENTS

| | | |
|---|---|---|
| 494,752 | 10/1938 | Great Britain. |
| 1,172,321 | 2/1959 | France. |

WILLIAM H. SHORT, *Primary Examiner.*

UNITED STATES PATENT OFFICE
CERTIFICATE OF CORRECTION

Patent No. 3,223,679　　　　　　　　　　　　December 14, 1965

Frederick C. Leavitt

It is hereby certified that error appears in the above numbered patent requiring correction and that the said Letters Patent should read as corrected below.

Column 12, lines 23 to 30, the formula should appear as shown below instead of as in the patent:

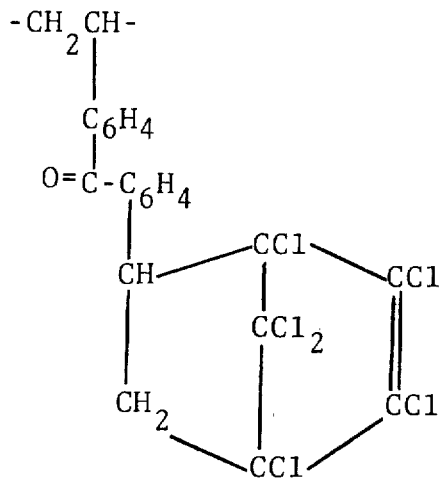

Signed and sealed this 25th day of October 1966.

(SEAL)
Attest:

ERNEST W. SWIDER　　　　　　　　　　　　EDWARD J. BRENNER
Attesting Officer　　　　　　　　　　　Commissioner of Patents